(12) United States Patent
Shaath

(10) Patent No.: US 6,438,642 B1
(45) Date of Patent: *Aug. 20, 2002

(54) FILE-BASED VIRTUAL STORAGE FILE SYSTEM, METHOD AND COMPUTER PROGRAM PRODUCT FOR AUTOMATED FILE MANAGEMENT ON MULTIPLE FILE SYSTEM STORAGE DEVICES

(75) Inventor: Kamel Shaath, Kanata (CA)

(73) Assignee: KOM Networks Inc., Kanata (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,181
(22) Filed: May 18, 1999
(51) Int. Cl.⁷ ............................................. G06F 12/00
(52) U.S. Cl. ........................................................ 711/100
(58) Field of Search ................................ 709/203, 229, 709/213, 214, 215, 216, 217, 218, 219; 711/112, 114

(56) References Cited

U.S. PATENT DOCUMENTS

| | | | |
|---|---|---|---|
| 4,989,206 A | * 1/1991 | Dunphy, Jr. et al. | 371/10.1 |
| 5,193,184 A | * 3/1993 | Belsan et al. | 395/600 |
| 5,495,619 A | 2/1996 | May et al. | 395/800 |
| 5,584,008 A | * 12/1996 | Shimada et al. | 395/441 |
| 5,771,354 A | 6/1998 | Crawford | 395/200.59 |
| 5,881,229 A | 3/1999 | Singh et al. | 395/200.33 |
| 6,148,369 A | * 11/2000 | Ofer et al. | 711/114 |

OTHER PUBLICATIONS

Peter Druschel and Antony Rowstron; "Past: A Large–Scale, Persistent Peer–to–Peer Storage Utility"; date: after Nov. 2001—received from client on Jan. 3, 2002.

* cited by examiner

Primary Examiner—Kevin Verbrugge
(74) Attorney, Agent, or Firm—Venable; Ralph P. Albrecht

(57) ABSTRACT

A managed space device and method is disclosed. To store data in the managed space a virtual non-volatile storage medium having a plurality of corresponding physical non-volatile storage media associated therewith is provided. Locations within each physical non-volatile storage medium correspond to locations within the virtual non-volatile storage medium. Then data for storage in the virtual non-volatile storage medium is provided. Once these are provided free space sufficient for storing the provided data is determined at locations within the virtual storage medium. The data is then stored at those locations and indexing information relating to the data is stored within an index.

20 Claims, 7 Drawing Sheets

FILE-BASED VIRTUAL STORAGE FILE SYSTEM, METHOD AND COMPUTER PROGRAM PRODUCT FOR AUTOMATED FILE MANAGEMENT ON MULTIPLE FILE SYSTEM STORAGE DEVICES

FIELD OF THE INVENTION

The present invention relates to non-volatile storage of data within computers and to non-volatile storage within computer network environments.

BACKGROUND OF THE INVENTION

A common problem with computer systems is that they are quickly outdated. In order to extend the life of a computer, two methods are commonly employed.

A first method involves purchasing a computer that has more resources than are necessary so that as computer technology advances and further resources are required the system remains sufficient. To this end, computers are commonly provided with hard disks that are substantially larger than necessary for most users. In this way, the computer life is extended without a need for upgrading. Unfortunately, this results in much unused or wasted storage space. That said, the storage available on hard disk drives soon is insufficient even for common applications. For example, 8 years ago a hard disk drive having 270 Mb of storage space was common. Today, such a device is insufficient for most common tasks on a PC compatible computer system. Today, most PC compatible computers have hard disk drives with 6 Gb of storage or more.

A second method involves upgrading parts of a computer where parts are replaced with newer parts when necessary. This is costly and inconvenient. For example, in order to accommodate the increased data storage requirements, it is common to upgrade a system by adding an additional hard drive to a system or replacing an existing hard drive. This requires shutting down the system and disconnecting it. The system must be opened and then, once the hard drive is installed, software is reconfigured to recognise the hard drive. All of this is done by a technician and is time consuming, resulting in "down time" for an employee whose system is being upgraded. Of course, when an entire network is formed of similar computers, upgrading of the network is extremely costly and inconvenient.

In order to save on these two problems, companies with large networks often have a server. Employees store data files on the server for archival purposes so that their disk space remains unused. Unfortunately, this has many drawbacks. First, a larger operating system may not fit on a local hard disk drive and so, sometimes an upgrade still is required. Second, much local hard disk space is wasted while awaiting some future time when it will be necessary to a local user. Third, each employee maintains their own archiving procedures and therefore, some employees will fail to archive and as such will still require an upgrade.

Of course, when a server is full, addition of more storage space to the server requires shutting down the server. Alternatively, another server can be added. When another server is added, some user accounts are moved to the other server resulting in some disruption. Most notably, however, moving user accounts around often results in one server filling up often while another rarely or never runs out of storage space.

In order to overcome these and other disadvantages of the prior art, it is an object of the present invention to provide a virtual storage device that can be upgraded dynamically without affecting users of the computer network.

Preferably, such a system will efficiently use available storage resources.

SUMMARY OF THE INVENTION

In accordance with the invention there is provided a virtual storage device comprising:

a plurality of computers each comprising a non-volatile storage medium, locations within some of the non-volatile storage media corresponding to locations within the virtual storage device;

means for storing data: at locations within the virtual storage device, the data stored at locations within a non-volatile storage medium from the non-volatile storage media corresponding to the locations within the virtual storage device; and means for storing index data, the index data for locating and retrieving data stored within the virtual storage device.

In accordance with another aspect of the invention there is provided a method of storing data in non-volatile storage comprising the steps of:

providing a virtual non-volatile storage medium having a plurality of corresponding physical non-volatile storage media associated therewith, locations within each physical non-volatile storage medium from the plurality of corresponding physical non-volatile storage media corresponding to locations within the virtual non-volatile storage medium;

providing data for storage in the virtual non-volatile storage medium;

determining free space at locations within the virtual storage medium, the free space sufficient for storing the provided data, the locations corresponding to locations within the plurality of corresponding physical non-volatile storage media having available storage space therein;

storing the provided data to the locations corresponding to the free space; and, storing index information for the stored data.

BRIEF DESCRIPTION OF THE DRAWINGS

An exemplary embodiment of the invention will now be discussed in conjunction with the attached drawings in which.

DETAILED DESCRIPTION OF THE INVENTION

Figure 1A:
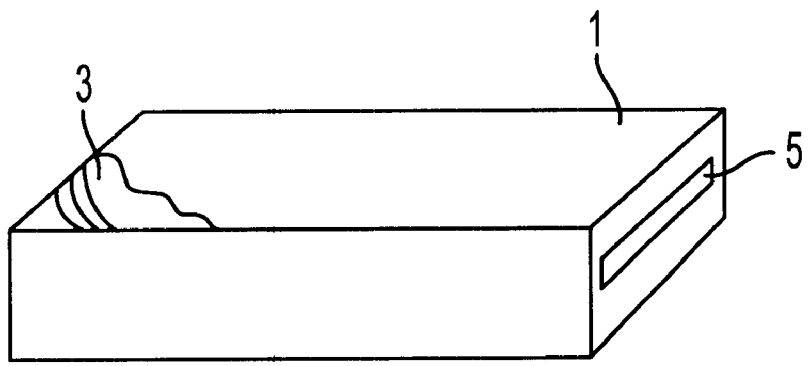
FIG. 1a is a simplified diagram of a prior art hard disk drive.

Referring to FIG. 1a, a prior art storage device in the form of a hard disk drive 1 is shown. The hard disk drive comprises several platters 3—disks—onto which data is written. The hard disk drive communicates with a computer via a port 5. When a single file is written to the hard disk drive 1, data may be written to each of the platters 3. Commonly, data is written to each platter 3 simultaneously to increase speed of data access and storage operations.

Figure 1B:
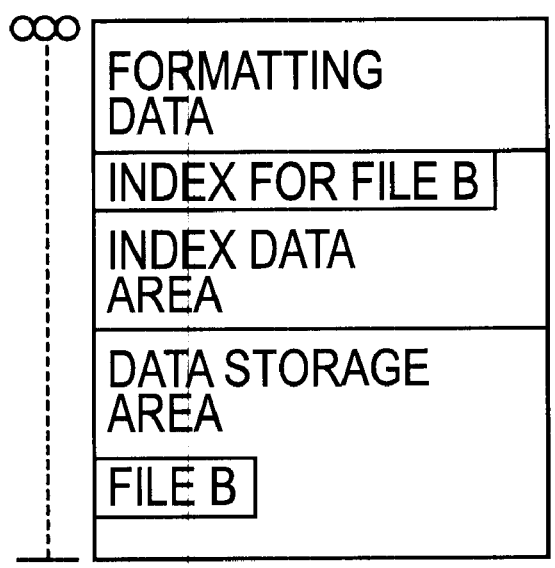
FIG. 1b is a simplified memory diagram of a prior art hard disk drive.

Referring to FIG. 1b, a memory table for a hard disk drive 1 is shown. The table is divided into a data storage area, a formatting area, and an index data area. The formatting are is for hard disk format data. The formatting data commonly includes indications of bad sectors within the platters, hard disk type, partitioning information for the hard disk drive and so forth. The data storage area is an area within the hard disk drive 1 where data is stored. The data is commonly stored in files. Information relating to file names and locations within the hard disk drive where the files are stored is contained within the index area. When a new file such as File B is stored, the system determines free sectors within the hard disk drive 1 for storing the file. Once free sectors are determined, the data is written to those sectors and the index information is updated to reflect the file data locations. The data need not be contiguous within the storage medium. Commonly, an operation called defragmenting is used to rearrange file data within the data storage area such that a single file occupies contiguous areas.

Figure 2:
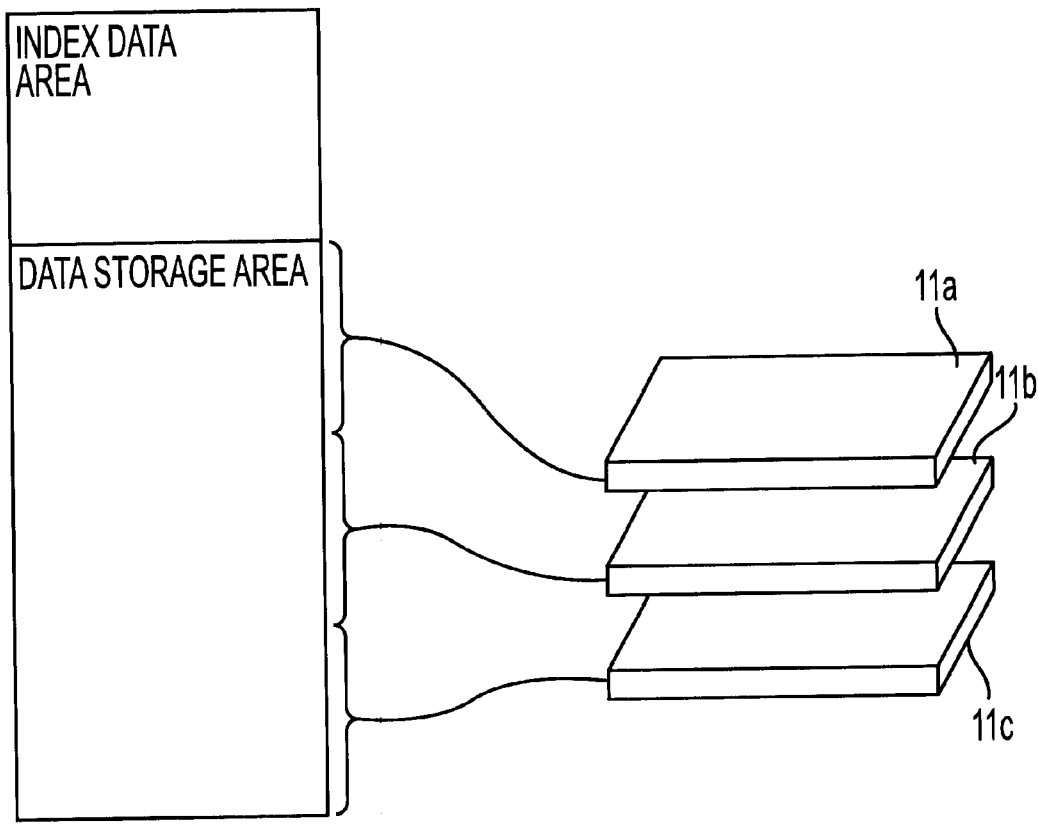
FIG. 2 is a simplified memory diagram of a virtual non-volatile storage device according to the invention.

Referring to FIG. 2, a virtual storage device in the form of a virtual storage medium according to the invention is shown. The storage medium need not have a formatting area since this relates to physical devices and not virtual devices. Alternatively, a formatting area includes data relating to redundancy, network optimisation, and available disk space. The drive does have an index area and a data storage area. Associated with the index area and with the virtual storage area are physical non-volatile storage devices or portions thereof. For example, as shown in FIG. 2, three physical non-volatile storage media in the form of hard disk drives 11 correspond to different portions of memory of the virtual storage device. The disk drives each correspond to contiguous memory portions. Alternatively, the disk drives each correspond to non-contiguous memory portions.

Within the index area of the virtual storage medium, data relating to a virtual storage location is used. Alternatively, data relating to a physical storage location is used along with data relating to the physical device to which the storage location relates. The data allows locating and retrieving of portions of a stored data file and/or an entire stored data file. In an embodiment, the index data comprises a location including a virtual sector and track location. This information is then translated into a physical sector and track location using a mapping table for the virtual storage medium. Alternatively, when index information is stored as a storage medium and a location within that storage medium, a need for a lookup table to translate virtual addresses is eliminated. Unfortunately, this alternative also makes moving of data or replacing of an entire physical storage medium more difficult.

Figure 3:
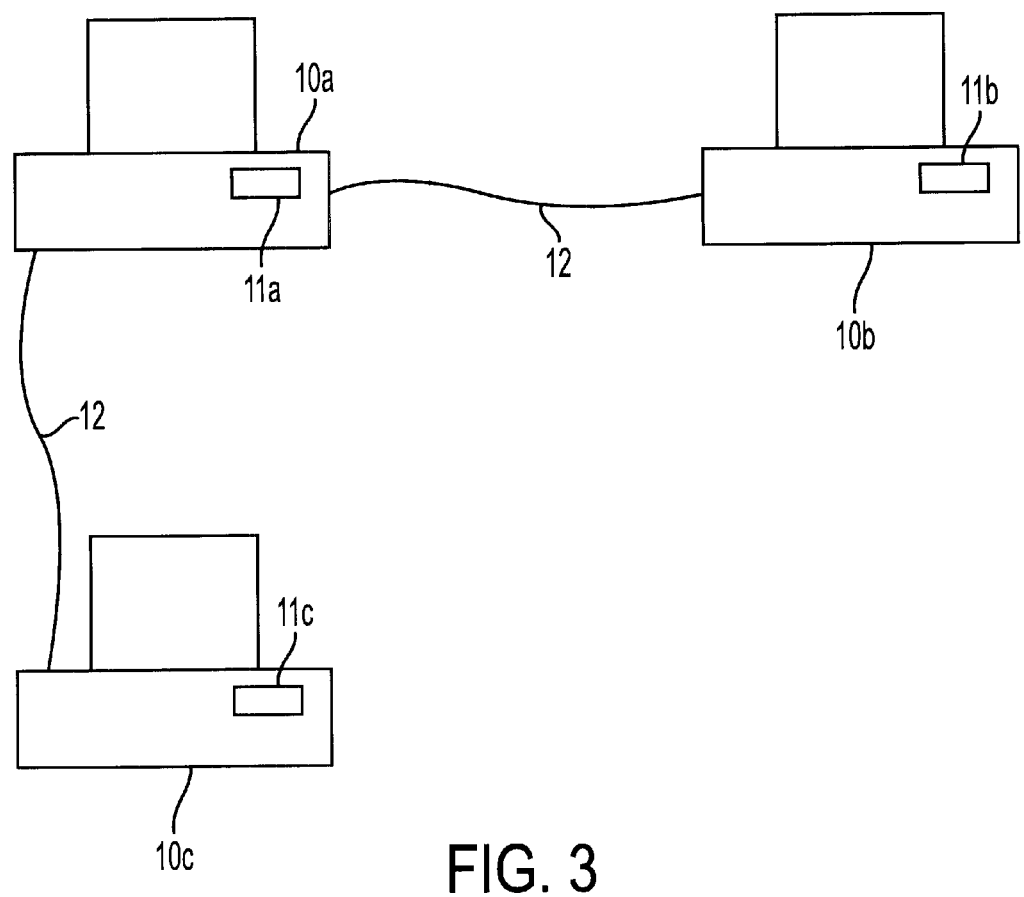
FIG. 3 is a simplified diagram of a computer network having three computers attached thereto for use in implementing the present invention.

Referring to FIG. 3, a network of computer systems is shown wherein a single virtual storage medium is formed using a plurality of available portions of physical storage media. Three computers 10a, 10b, and 10c are in communication through a network 12. Each computer has a hard disk drive. The hard disk drives have two areas. A first area is for local file storage for a user of the computer. A second area forms part of a virtual disk drive. Dividing a disk drive into areas is performed in one of a number of ways depending on design criteria. For example, hard disk partitioning is used in some applications. In other applications, a large portion of the disk is reserved for a single file that is not moveable. This file and its contents are not accessible tot he local computer other than through the virtual disk drive. In yet another application, the virtual disk drive file portions are stored as files on the local hard disk drive and are accessible to a user thereof.

Figure 4:
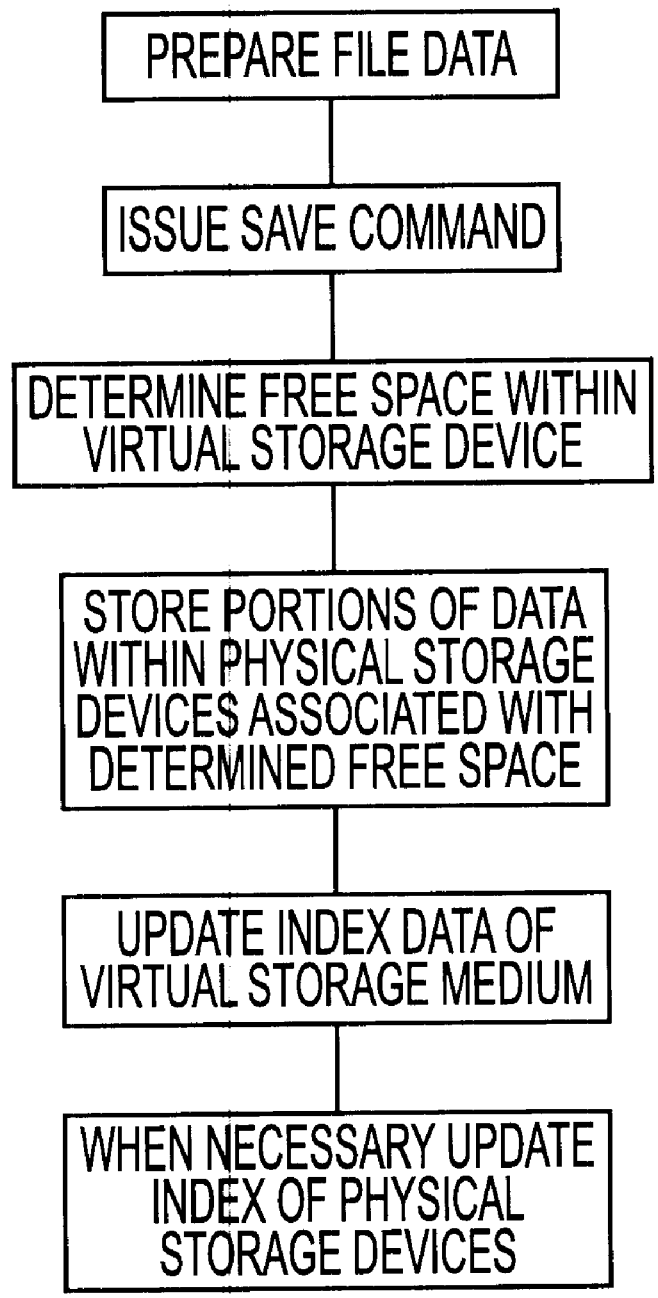
FIG. 4 is a simplified flow diagram of a method of storing data in a data file within the virtual storage medium.
Figure 5:
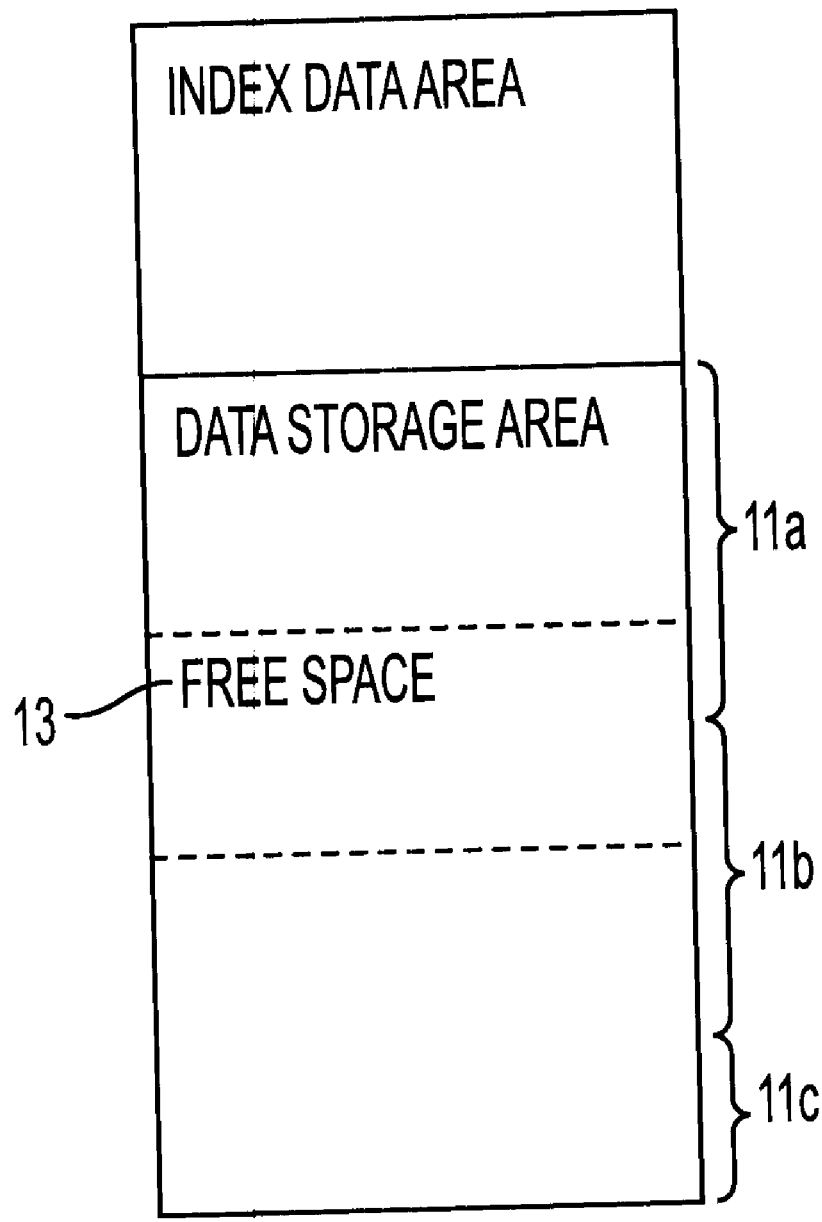
FIG. 5 is a simplified memory diagram of a virtual storage medium according to the invention.

Referring to FIG. 4, a flow diagram of a method of storing data within the virtual storage device of FIG. 2 in a network configuration as shown in FIG. 3 is shown. The data file is created on a computer system in communication with the physical storage media 11a, 11b, and 11c. When the data file is saved to the virtual storage medium—a save command is issued—the system determines free space 13 within the virtual storage device. Referring to FIG. 5, it is evident that this free space 13 spans two disk drives 11a and 11b. Of course, the free space may comprise non-contiguous portions of the virtual storage device and is shown in FIG. 5 as a block for illustrative purposes. only. A first portion of the file is stored within the first disk drive and a second other portion of the file is stored within the second disk drive. In the index area is stored an identifier indicating the physical disk drive and the location thereon of each portion of the data file. Alternatively, the physical disk drive is determined from a table or other predetermined data mapping areas within the virtual storage device to physical disk drives. Once the data is stored within the physical disk drives, any virtual drive that includes the space now occupied by the file receives data for updating their index data. This provides for automated file sharing when desirable.

Figure 6:
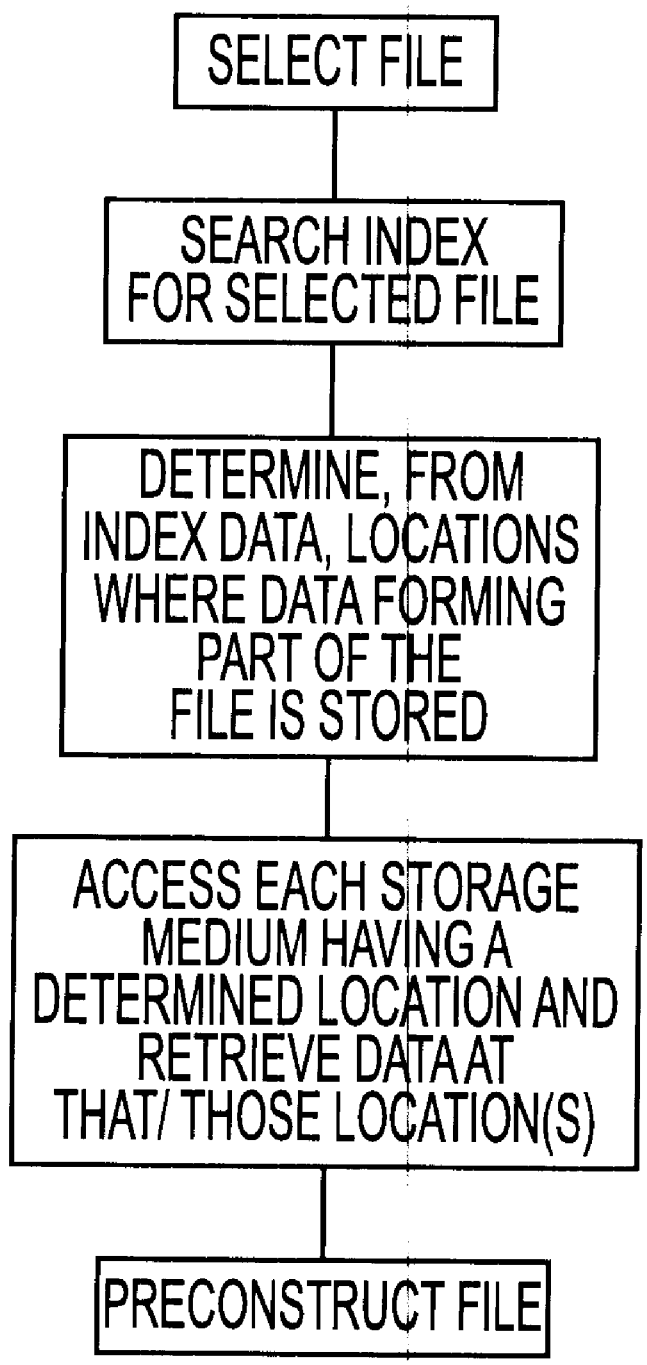
FIG. 6 is a simplified flow diagram of a method of reading the data file from the virtual storage device; and, FIG. 7 is a simplified flow diagram of a method of archiving data.

Referring to FIG. 6, a flow diagram of a method of reading the data file from the virtual storage device is shown. A file is selected for reading by a computer system. The file is generally selected based on a file name. The file name is used to search the index data area of the virtual storage medium in order to determine a location of data forming the file. The information indicates a location within a physical storage device and a specific physical storage device. In some applications, the data indicates a location within another data index where the actual file related information is stored.

The computer system retrieves the data from the locations specified in the index. Some data portions are stored locally. Other data portions are stored on network accessible storage devices in the form of hard disk drives. The data is retrieved from each data source and the file is reconstructed locally. Of course, when the entire file is not necessary, the file is accessed where it is and is not reconstructed locally. Because a data file can be stored and retrieved from the virtual storage medium, applications requiring large amounts of disk space such as database applications are easily supported. In fact, when data storage space is insufficient to support a database application, the addition of a single hard disk drive to a network and the inclusion of the new hard disk drive within the virtual storage medium increases available storage.

Regardless of a new employee needs, a new computer for that employee is often purchased with a same commonly available configuration. Advantageously, a portion of the non-volatile storage available to the new user is allocated. to the virtual storage medium. In this way, the virtual storage medium is ever increasing in capacity with little or no incremental cost to an organisation.

According to the invention, the virtual storage medium is provided with automated storage device optimisation. Files that are often accessed by specific users are stored local to those users. Files that have not been accessed for more than a predetermined length of time are stored on remote archiving systems. Files that are small are stored on one system. Important files are stored in several locations. This provides many advantages such as redundancy to prevent data loss in case of device failure and redundancy for allowing retrieval of a portion of a data file by two separate systems from two different storage media simultaneously.

Moving of data files automatically allows for automatic archiving of data in order to keep free storage space within a storage medium to a maximum. Examples of automated archiving follow, but other methods of automatically archiving data are also within the scope of the present invention.

Figure 7:
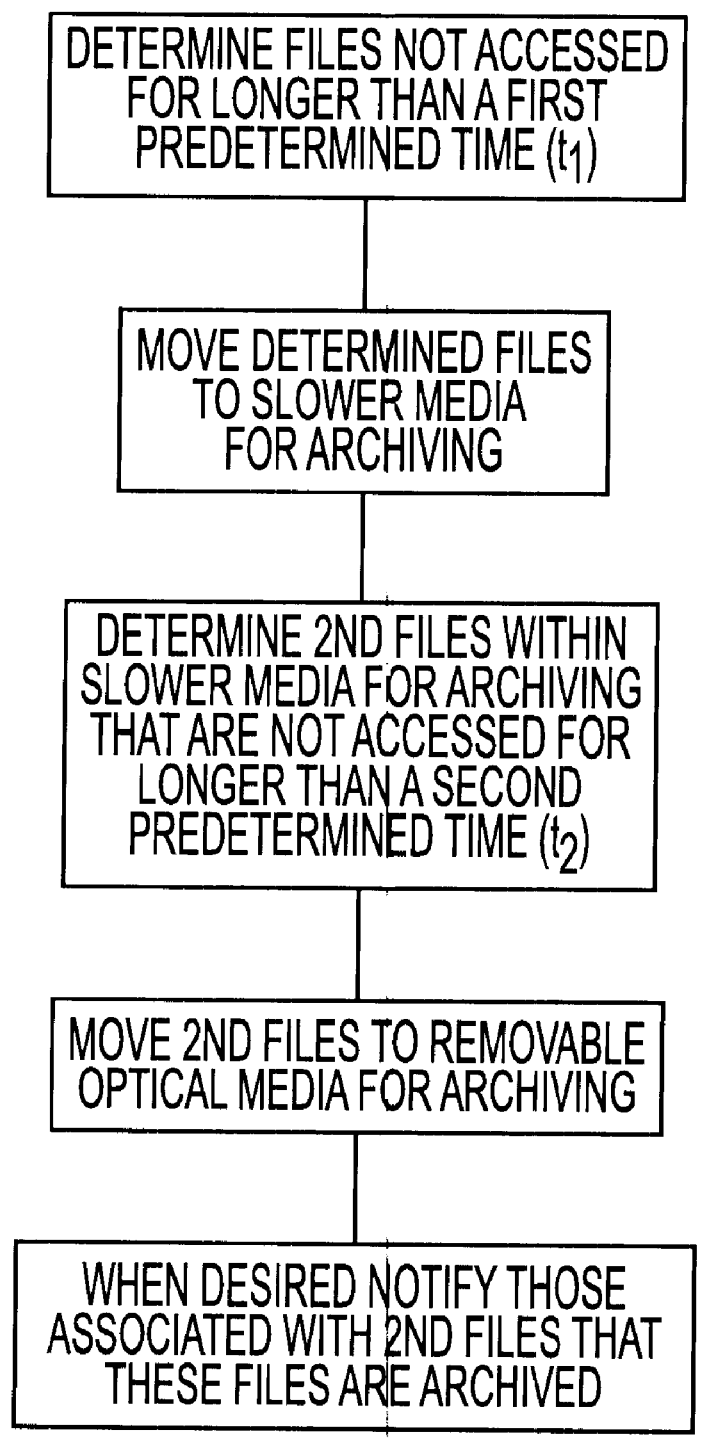

Referring to FIG. 7, a method of archiving data is shown. Files that are not accessed for over 30 days are moved to an archiving server. They remain within the virtual storage device for another thirty days of non-use. Once 60 days have elapsed, the files are stored on optical media such as CD-ROM. When sufficient files from a same user are group are due for archiving storage, they are written to a CD-ROM for archiving. The group or individual are notified that should they wish to have a copy of the CD-ROM, one will be provided. When archiving consists of archiving many smaller files from different users and groups, the data is stored on the optical medium, erased from the archiving server, and the optical medium is stored in a safe place. Optionally, the files are removed from the virtual storage medium. Alternatively, the optical storage medium is included within the virtual storage medium and, access to those files is possible, but delayed.

The virtual storage medium in the form of a virtual hard disk drive is also provided with security such as that typical to hard disk drives. Individual files are protected as are directories, disks and so forth. By using encryption of data within the virtual storage medium, it is possible to restrict access to files, file portions, and to data stored on predetermined physical devices to any particular user of the system. Because physical device access and data access are performed by the file system without user intervention or know how, the system security is implemented at this same level. Files that are not accessible from a particular system or to a particular user do not appear within the index. Alternatively, the file names appear but the files are not accessible.

Of course, when data is encrypted, a user's hard disk is divided into an encrypted portion that forms part of the virtual storage medium and an unencrypted part. In the unencrypted part is stored the user's operating system, personal files, and applications when stored locally.

Preferably, the virtual storage medium index is stored within the virtual storage medium but local to a user. Alternatively, it is stored on the user's personal portion of the hard disk drive. In either of these embodiments, removal of a computer within the network results in few problems, particularly when data duplication exists. Alternatively, when the index is stored on a single system central to all users, the removal of that system results in a tremendous loss of data since all the data within the virtual storage medium is now unindexed. Of course, data duplication may also be used on the index data.

Preferably, index data is stored on a central system and local to individual users. This allows for a master index of data within the virtual storage medium. The master index is useful for determining free space, for archiving of data, and for security access control purposes. The local indices are useful for maintaining a smaller index of files that are accessible by a particular user, maintaining control of a user's own files, and for quick access to index data. Also, storage of index data local to a user's computer system reduces network traffic and thereby, improves overall network performance.

Optionally, storage devices within the system are divided according to device type. In the example below, the virtual storage devices are termed managed space. When the Windows NT® operating system is used, the boot and system partitions within the boot up devices cannot be managed space devices—virtual storage devices—because until the operating system is loaded, the managed space device drivers are not operational. Of course, when other operating systems are used, this may not be the case.

It is known to store archival data within a library. A library comprises a plurality of storage devices such as a CD-ROM jukebox or tower or a bank of hard disk drives. Libraries are classified in two main types, on-line and off-line. On-line libraries are always available. They are made up of media that are available without human intervention. Off-line libraries are not always immediately available. For example, a cabinet full of CDs forms an off-line library. In order to access particular CDs, it is often necessary for a human user to find a particular CD and insert it within a CD ROM drive. Sometimes this operation involves removing a CD from the CD ROM drive. Both on-line and off-line libraries can be managed using a virtual storage device according to the invention. In either case, the library is managed as one or more managed spaces. This alleviates a need to split related information because of insufficient storage space within a single storage medium in the form of a CD-ROM. Preferably, managed space is used for on-line libraries.

A pool is a set of media within an on-line library that is managed as a single unit. Pools are characterised by the types of the media they contain and by an organisational unit that "owns" the pool. Generally, pools are classified according to media type and according to options available with those media. Some media are better suited to use with managed space than others and so, media that is best suited to use with managed space is associated with a pool of managed space "ready" media. The use of pools is highly advantageous in organisation of media.

For example, monitoring of systems to determine devices that are not commonly available all the time allows pooling of those devices into a pool of available devices. Another pool is formed of devices that are commonly available all the time. When a virtual storage medium is intended to be an on-line storage device, media are selected from the latter pool to form the physical storage space for the virtual storage medium. The managed space is therefore available most, if not all, of the time. Optionally, when a pattern of availability of a physical storage medium within a pool is changed, the physical device is associated with a more appropriate pool. When the managed space is associated with a particular pool and a physical storage device forming part of the virtual storage medium is associated with a different pool, it is preferred that data within the physical device is transferred to a different physical device. In this way, the virtual storage medium maintains consistent attributes.

Optionally, pools of physical devices overlap; a single physical device forms part of several pools. For example, a physical device is in the off-line pool, in the virtual disk pool, and in the read-only pool. Another physical device is in the on-line pool, in the always available pool, and in the managed space pool. A third physical device is in the on-line pool, in the always available pool, and in the system partition pool. Further optionally, a pool spans more than one library and includes physical media that are not within libraries.

A third classification or grouping of physical storage media is groups. Groups are subsets of pools and are useful for defining sets of devices within a pool for forming a single managed space or for forming a library portion. Typically a group is formed from a single pool, though a pool may include several groups.

Classification of physical storage devices for use in managed space is highly advantageous. For example, hard disk drives are fast and effective methods of storing on-line data that is always available. Unfortunately, with each generation of hard disk drives, speed and capacity grow. By grouping the hard drives such that data stored therein is associated with the group, segmentation of data at a higher level occurs. Therefore, a group of fifty hard disk drives that are ten years old are easily replaced with a single hard disk drive today. The replacement is seamless since the group is homogenous and the replacement device type is similar. In order to upgrade the 50 old devices with one new one, a new system is installed having a single large hard drive partition. An administrator indicates that the data from the group is to be moved onto the hard drive partition and that partition is to be the group. The data is moved in the background and, once moved, the indices are updated to reflect the move. Once the move is completed the old hard disk drives are reallocated to a pool of available resources. Alternatively, the old systems are upgraded or replaced since their physical storage media no longer form part of a virtual storage medium.

Another advantage to grouping of physical storage media within groups is that administration of the physical media is simplified. For example, a single manager is likely responsible for costs associated with the group. A single manager can decide whether or not to upgrade. Backup of the data is performed for that manager and their associated staff. Further, should that manager move to another building, the group of physical devices can easily be moved to follow.

According to an embodiment, management of a virtual storage medium is effected using policies. Policies are well known in operating system implementation and in security system implementation. Policies typically include permissions relating to who can alter what data, access control, who can create media and so forth. When using a virtual storage medium, further policies are beneficial. For example, access priorities are set as policies. Because managed space operates across a network, it is beneficial to set up performance related policies so that certain individuals have priority for data retrieval requests. For example, an administrator or a senior employee is provided with fast access priority while an administrative assistant has slower access priority. When data access requests are queued, they are serviced based on priority, time of receipt of the request, and any policies relating generally to access priorities. Another policy that is useful relates to scheduling priorities. When a user selects a set of files to work on the next day, those files are easily retrieved and moved at night. It is very useful, however, that at 8:30 in the morning the system is provided with a reasonable scheduling policy for use in serving employees trying to access files at the start of the day. Usually, the greatest file access requirements occur at the beginning and end of the workday. The end of the workday is usually characterised by an unusually high number of store data requests—save file—which are easily handled in a buffered manner with data finally being stored in a correct location at some later time. The morning requests are for file retrieval and, therefore, require scheduling to optimise data delivery.

A method of optimising data delivery for users of managed space is to execute a task to retrieve files during the night, when network usage is low. The task operates to reorganise file locations, archive old data, move data files where they are most likely to be needed, perform scheduled tasks such as retrieving files for an employee that is organised and knows what will be needed during the upcoming day or days and so forth. Optionally, the task also selectively compresses archived data, consolidates files that span more than one physical storage device when possible, performs virus checks, performs defragmentation, performs physical media checks, verifies indices and so forth. A well designed task, enables a managed space to operate with little human intervention and only a small amount of administration.

Numerous other embodiments may be envisaged without departing from the spirit or the scope of the invention.

What is claimed is:

1. A method of providing automated file management comprising the steps of storing data in a virtual file-based non-volatile storage medium comprising:

providing said virtual file-based non-volatile storage medium having a file-based automated file management file system interfacing with a plurality of file system storage partitions of a plurality of corresponding physical non-volatile storage media associated therewith, locations within each physical non-volatile storage medium of said plurality of corresponding physical non-volatile storage media corresponding to locations within said virtual file-based non-volatile storage medium;

providing data for storage in said virtual file-based non-volatile storage medium using said file-based automated file management file system;

determining any free space at said locations within said virtual file-based non-volatile storage medium, said free space sufficient for storing the provided data, locations having said any free space corresponding to said locations within said plurality of corresponding physical non-volatile storage media having available non-volatile storage space therein;

storing the provided data at said locations having said any free space; and storing index information for the stored data.

2. The method as defined in claim 1 wherein the index information comprises data indicative of a file identifier, and locations within said virtual file-based nonvolatile storage medium for the stored data.

3. The method as defined in claim 1 wherein the index information comprises data indicative of a file identifier, an indication of said physical non-volatile storage medium on which the stored data is stored, and the corresponding locations within said physical non-volatile storage medium for the stored data.

4. The method as defined in claim 3 wherein some of the stored data stored within one of said physical non-volatile storage media is duplicated data of data stored in another of said physical non-volatile storage media.

5. The method as defined in claim 3 wherein a portion of the stored data less than the whole is stored on a first physical non-volatile storage medium and another portion of the stored data less than the whole is stored on a second physical non-volatile storage medium.

6. A method as defined in claim 3 wherein said first physical non-volatile storage medium and said second physical non-volatile storage medium form part of different computer systems in communication one with the other via a communication network.

7. The method as defined in claim 1 comprising the steps of:

monitoring access to stored data;

determining from the monitored access a location within the virtual file-based non-volatile storage medium for the stored data;

moving the stored data to the determined location; and updating the index data to reflect the new storage location of the stored data being the determined location.

8. The method as defined in claim 1 comprising the steps of:

verifying the presence of another physical non-volatile storage medium in communication with the virtual file-based non-volatile storage medium; and associating the other physical non-volatile storage medium with the virtual file-based non-volatile storage medium thereby dynamically increasing available non-volatile storage space on said virtual file-based non-volatile storage medium.

9. The method as defined in claim 8 comprising the step of connecting another computer to a computer network in communication with the virtual file-based non-volatile storage medium wherein the presence of another physical non-volatile storage medium is effected by the connection of the other computer.

10. The method as defined in claim 1 comprising the steps of:
   monitoring access to stored data; and
   archiving stored data that is not accessed for more than a predetermined amount of time.

11. The method as defined in claim 10 herein the step of archiving the stored data comprises transferring the stored data to an area within the virtual file-based non-volatile storage medium for archiving, the method comprising the steps of:
   monitoring access to archived data; and
   transferring archived data that is not accessed for more than a predetermined amount of time to a removable physical non-volatile storage media for archiving.

12. A virtual file-based non-volatile storage device comprising:
   an automated file management file system;
   a plurality of computers each comprising one or more file system partitions on a physical non-volatile storage medium, locations within a plurality of said physical non-volatile storage media corresponding to locations within the virtual file-based non-volatile storage device, said physical non-volatile storage media forming parts of two different computer systems wherein each of said file system partitions is interfaced to said automated file management file system;
   means for storing data at locations within said virtual file-based non-volatile storage device, portions less than the whole of the data stored at locations within a first physical non-volatile storage medium from the plurality of physical non-volatile storage media and other portions less than the whole of the data stored at locations within a second other physical non-volatile storage medium from said plurality of physical non-volatile storage media corresponding to the locations within said virtual file-based non-volatile storage device; and
   means for storing index data, the index data for locating and retrieving data stored within said virtual file-based non-volatile storage device.

13. The virtual file-based non-volatile storage device as defined in claim 12 wherein the means for storing index data comprises:
   means for updating index data, the index data indicative of a location within said virtual file-based non-volatile storage medium where the data is stored, the location corresponding to locations within said physical non-volatile storage media.

14. The virtual file-based non-volatile storage device as defined in claim 12 wherein said means for storing index data comprises:
   means for updating index data, the index data indicative of said physical non-volatile storage medium and a location within said physical non-volatile storage medium where the data is stored.

15. The virtual file-based non-volatile storage device as defined in claim 12 comprising:
   means for archiving data stored within said virtual file-based non-volatile storage device.

16. A method of storing data in a virtual file-based non-volatile storage comprising the steps of:
   providing a virtual file-based non-volatile storage medium having an automated file management file system having in turn, and interfacing with, a plurality of file system partitions of a plurality of corresponding physical non-volatile storage media associated therewith, locations within each physical non-volatile storage medium from the plurality of corresponding physical non-volatile storage media corresponding to locations within said virtual file-based non-volatile storage medium;
   providing data for storage in said virtual file-based non-volatile storage medium;
   determining free space at locations within the virtual file-based non-volatile storage medium, the free space sufficient for storing the provided data, the locations corresponding to locations within the plurality of corresponding physical non-volatile storage media having available storage space therein;
   storing the provided data at the locations corresponding to the free space; and
   storing index information for the stored data, wherein the physical non-volatile storage media form parts of different computer systems in communication with each other via a communication network.

17. The method as defined in claim 16 comprising the steps of:
   monitoring access to stored data;
   determining from the monitored access a location within the virtual file-based non-volatile storage medium for the stored data;
   moving the stored data to the determined location; and
   updating the index data to reflect the new storage location of the stored data.

18. The method as defined in claim 16 comprising the steps of:
   verifying the presence of another physical non-volatile storage medium in communication with the virtual file-based non-volatile storage medium; and
   associating the other physical non-volatile storage medium with the virtual file-based non-volatile storage medium thereby dynamically increasing available physical non-volatile storage space of the virtual file-based non-volatile storage medium.

19. The method as defined in claim 18 comprising the step of connecting another computer to a computer network in communication with the virtual file-based non-volatile storage medium wherein the presence of another physical non-volatile storage medium is effected by the connection of the other computer.

20. The method as defined in claim 16 comprising the steps of:
   monitoring access to stored data; and
   archiving stored data that is not accessed for more than a predetermined amount of time.

* * * * *